Patented Sept. 4, 1945

2,384,425

UNITED STATES PATENT OFFICE 2,384,425

METHOD OF MAKING TETRAIODOPHENOL-PHTHALEIN

Leonard E. Sargent, Yonkers, N. Y., assignor to Burroughs Wellcome & Co. (U. S. A.) Inc., New York, N. Y., a corporation of New York No Drawing. Application July 30, 1943,
Serial No. 496,770

11 Claims. (Cl. 260—337)

This invention relates to a new method for the purification of tetraiodophenolphthalein as well as to the purified tetraiodophenolphthalein and its disodium salt and is a continuation-in-part of my co-pending application Serial Number 440,981, filed April 29, 1942.

Disodium tetraiodophenolphthalein is commonly used in cholecystography. For this purpose it is precipitated in the form of a finely divided milky suspension. It has been found that due to the limitations of the heretofore known commercial methods of purification, the products which have been used up to the present possess disagreeable characteristics of color, odor and taste. The color is subject to variations which are objectionable from the consumers' standpoint and the inherent disagreeable taste and odor are difficult to mask.

It is accordingly one object of the present invention to provide a novel and improved purification process for improving the color, odor and taste of tetraiodophenolphthalein and to produce a composition having the desired cholecystographic characteristics while being completely free from color variations as well as from objectionable taste and odor.

Another object of the invention is to provide a purification process for tetraiodophenolphthalein which can be carried out on a commercial basis with readily available purifying agents in a simple but highly efficient manner.

In accordance with the present invention, crude tetraiodophenolphthalein, which may be made by any one of various known processes, is purified by a treatment in aqueous suspension with finely divided charcoal. According to a preferred embodiment of the invention, a complete purification of the tetraiodophenolphthalein is obtained by treating the crude product first in an aqueous suspension with an alkali sulfite, and subsequently also in an aqueous suspension with finely divided active charcoal under conditions to remove the undesirable characteristics above referred to. After precipitation, filtering and drying, a purified tetraiodophenolphthalein is obtained which may be marketed as such, or in the form of its disodium salt possessing the same improved characteristics.

A typical purification process in accordance with a preferred embodiment of the present invention, includes for instance the following steps:

1. Crude tetraiodophenolphthalein is suspended in water and dissolved with an alkali hydroxide, such as sodium hydroxide or potassium hydroxide, solution.

2. An alkali sulfite solution, such as sodium or potassium sulfite solution is added.

3. An inorganic or organic acid is introduced to precipitate the tetraiodophenolphthalein which is then separated by filtration.

4. The precipitate is resuspended in water and a suspension of finely divided active charcoal is added.

5. An alkali hydroxide, such as sodium hydroxide or postassium hydroxide is added to dissolve the tetraiodophenolphthalein, and the charcoal and other impurities are filtered off.

6. An inorganic or organic acid is introduced to precipitate the purified tetraiodophenolphthalein which is then filtered and dried.

7. The purified tetraiodophenolphthalein may be marketed as such or it may be converted into its disodium salt.

It has been found that practically any acid may be used to accomplish precipitation of the tetraiodophenolphthalein from its alkaline solutions. Even carbon dioxide is effective since the precipitation occurs in the range of pH 8.2 to 8.8.

The following list of acids is given as a non-limitative illustration:

(a) Inorganic acids: hydrochloric acid, boric acid, sulfuric acid, phosphoric acid, carbon dioxide.

(b) Organic acids: oxalic acid, acetic acid, benzoic acid, salicylic acid, lactic acid, citric acid.

In practice hydrochloric acid and oxalic acid are preferred as precipitating agents because they are inexpensive, readily available, practically non-toxic and easy to handle.

The following specific examples are given to illustrate without limiting the invention.

Example 1

23 grams of crude, moist, tetraiodophenolphthalein were suspended in 240 cc. of water and dissolved by the addition of dilute sodium hydroxide solution. 1 gram of sodium sulfite was added. When the solution was complete, the tetraiodophenolphthalein was precipitated by the gradual addition of hydrochloric acid. The suspension was allowed to stand for two hours, then heated to 80° C., cooled, filtered, and washed with water. 5 grams of this product were suspended in 30 cc. of water, dissolved by adding dilute alkali and precipitated with citric acid. The color of the precipitate was a very light cream, almost white. It has an odor of iodine and the taste was disagreeable, characteristically like iodine.

Example 2

23 grams of crude, moist, tetraiodophenolphthalein were suspended in 240 cc. of water and 2 grams of finely divided active charcoal. The suspension was stirred on a steam bath for three hours, cooled and dissolved by the addition of dilute sodium hydroxide solution. The solution was filtered to remove the charcoal. The tetraiodophenolphthalein was then precipitated with hydrochloric acid, heated to 80° C., cooled, filtered and washed with water. 5 grams of this product were suspended in 30 cc. of water, dissolved by adding dilute alkali and precipitated with citric acid. The color of this product was cream. It had no odor and there was no taste, except that of the citric acid.

Example 3

Crude tetraiodophenolphthalein was suspended in water and dissolved by adding sufficient aqueous solution of technical sodium hydroxide. A sufficient quantity of aqueous solution of sodium sulfite to obtain the desired bleaching effect was then added with continuous stirring and the tetraiodophenolphthalein was precipitated by slowly adding concentrated hydrochloric acid at room temperature. The suspension thus formed was agitated intermittently until a good bleach was obtained. It was then heated to aid coagulation, cooled, and the suspended tetraiodophenolphthalein was removed by filtration in the form of a cake which was thoroughly washed with filtered tap water and blow with air until partially dry. The partially purified tetraiodophenolphthalein was suspended in water, an aqueous suspension of charcoal was added, and the suspension was heated with continuous stirring until maximum adsorption had been effected. The tetraiodophenolphthalein was then dissolved by slowly adding an aqueous solution of technical sodium hydroxide. The solution was filtered and diluted to a volume suited to allow precipitation of the tetraiodophenolphthalein by the addition of chemically pure hydrochloric acid. The purified tetraiodophenolphthalein was then filtered off, washed and dried. The product obtained was a pure white amorphous powder completely free from any objectionable odor or taste. It melts under decomposition at 284° C.

Example 4

The purified tetraiodophenolphthalein was converted into its disodium salt by making a water suspension of the tetraiodophenolphthalein, dissolving with about the theoretical amount of sodium hydroxide solution, removing the impurities, filtering and drying to obtain the final disodium tetraiodophenolphthalein in the form of blue crystals free of objectionable odor or taste.

Example 5

Example 3 was repeated using potassium hydroxide in place of sodium hydroxide, potassium sulfite in place of sodium sulfite and oxalic acid in place of hydrochloric acid. The resulting product was pure white, amorphous, odorless and tasteless.

What is claimed is:

1. The herein described process of improving the characteristics of tetraiodophenolphthalein, which process comprises the steps of making an aqueous alkaline solution of tetraiodophenolphthalein and an alkali sulfite, converting the alkali sulfite into sulfurous acid by means of a stronger acid which also causes the formation of a finely divided suspension of tetraiodophenolphthalein particles gradually growing in size while acted upon by the sulfurous acid, separating the tetraiodophenolphthalein, forming an aqueous suspension of the pretreated tetraiodophenolphthalein and causing finely divided active charcoal to act on the suspended solid particles of tetraiodophenolphthalein.

2. The herein described process of improving the characteristics of tetraiodophenolphthalein, which process comprises the steps of forming an aqueous suspension of tetraiodophenolphthalein, contacting the finely divided tetraiodophenolphthalein in said suspension with finely divided active charcoal, adding sufficient alkali hydroxide to dissolve the tetraiodophenolphthalein, thus causing a gradual reduction of the particle size of the tetraiodophenolphthalein while the charcoal acts on the suspended material, filtering to remove the charcoal and other impurities, precipitating the tetraiodophenolphthalein by means of an acid, and filtering, washing and drying the final precipitate.

3. The herein described process of improving the characteristics of crude tetraiodophenolpthalein, which process comprises the steps of making an aqueous alkaline solution of crude tetraiodophenolphthalein and an alkali sulfite, converting the alkali sulfite into sulfurous acid by means of a stronger acid which also causes the formation of a finely divided suspension of tetraiodophenolphthalein particles gradually growing in size while acted upon by the sulfurous acid, separating the tetraiodophenolphthalein, resuspending the same in water in contact with finely divided active charcoal, adding sufficient alkali hydroxide to dissolve the tetraiodophenolphthalein thus causing a gradual reduction in the particle size of the tetraiodophenolphthalein while the charcoal acts on the suspended material, filtering to remove the charcoal and other impurities, precipitating the tetraiodophenolphthalein by means of an acid, and filtering, washing and drying the final precipitate.

4. A process, as claimed in claim 3, in which the alkali hydroxide added to dissolve the tetraiodophenolphthalein is sodium hydroxide in the form of an aqueous sodium hydroxide solution.

5. A process, as claimed in claim 3, in which the alkali sulfite present in the alkaline solution of tetraiodophenolphthalein is sodium sulfite in the form of an aqueous sodium sulfite solution.

6. A process, as claimed in claim 3, in which the acid added at various stages of the process to precipitate the tetraiodophenolphthalein from its alkaline solutions is hydrochloric acid.

7. A process, as claimed in claim 3, in which the acid added at various stages of the process to precipitate the tetraiodophenolphthalein from its alkaline solutions is oxalic acid.

8. The herein described process of making disodium tetraiodophenolphthalein having improved characteristics, which process comprises the steps of making an aqueous suspension of crude tetraiodophenolphthalein, adding sufficient alkali hydroxide to dissolve the tetraiodophenolphthalein, adding an alkali sulfite, converting the alkali sulfite into sufurous acid by means of a stronger acid which also causes the formation of a finely divided suspension of tetraiodophenolphthalein particles gradually growing in size while acted upon by the sulfurous acid, separating the tetraiodophenolphthalein, resuspending the same in water in contact with finely divided active charcoal, adding sufficient alkali hydroxide to dissolve the tetraiodophenolphthalein thus causing a gradual reduction in the particle size of the tetraiodophenolphthalein while the charcoal acts on the suspended material, filtering to remove the charcoal and other impurities, precipitating the tetraiodophenolphthalein by means of an acid, filtering washing and drying the final precipitate, and treating the product with a sodium hydroxide solution under conditions to form sodium tetraiodophenolphthalein.

9. The method of improving the characteristics of crude tetraiodophenolphthalein which comprises making an aqueous suspension of said crude tetraiodophenolphthalein, dissolving the suspended tetraiodophenolphthalein with a sodium hydroxide solution, adding a sodium sulfite solution, adding sufficient hydrochloric acid to convert the sodium sulfite into sulfurous acid and to cause the formation of a finely divided suspension of tetraiodophenolphthalein particles gradually growing in size while acted upon by the sulfurous acid, separating the tetraiodophenolphthalein, resuspending the same in water in contact witn finely divided active charcoal, dissolving the suspended tetraiodophenolphthalein with sodium hydroxide thus causing a gradual reduction in the particle size of the tetraiodophenolphthalein while the charcoal acts on the suspended material, filtering to remove the charcoal and other impurities, precipitating the purified tetraiodophenolphthalein with hydrochloric acid, filtering, washing and drying the same to obtain the purified tetraiodophenolphthalein.

10. The method of making disodium tetraiodophenolphthalein having improved characteristics which comprises making an aqueous suspension of said crude tetraiodophenolphthalein, dissolving the suspended tetraiodophenolphthalein with a sodium hydroxide solution, adding a sodium sulfite solution, adding sufficient hydrochloric acid to convert the sodium sulfite into sulfurous acid and to cause the formation of a finely divided suspension of tetraiodophenolphthalein particles gradually growing in size while acted upon by the surfurous acid, separating the tetraiodophenolphthalein, resuspending the same in water in contact with finely divided active charcoal, dissolving the suspended tetraiodophenol phthalein with sodium hydroxide thus causing a gradual reduction of the particle size of tetraiodophenolphthalein while the charcoal acts on the suspended material, filtering to remove the charcoal and other impurities, precipitating the purified tetraiodophenolphthalein with hydrochloric acid, filtering, washing and drying the same to obtain the purified tetraiodophenolphthalein, and treating the purified tetraiodophenolphthalein with a sodium hydroxide solution under conditions to form disodium tetraiodophenolphthalein.

11. The herein described process of improving the characteristics of tetraiodophenolphthalein, which process comprises the steps of forming an aqueous suspension of tetraiodophenolphthalein, contacting the finely divided solid tetraiodophenolphthalein in said suspension with finely divided active charcoal and combining the suspension containing the tetraiodophenolphthalein and charcoal with a sufficient quantity of an alkaline medium to dissolve the tetraiodophenolphthalein while intimately mixed with the charcoal.

LEONARD E. SARGENT.